United States Patent [19]

Ungchusri et al.

[11] Patent Number: 4,527,806
[45] Date of Patent: Jul. 9, 1985

[54] VALVE STEM PACKING

[75] Inventors: Tep Ungchusri, The Woodlands; William J. Jakubowski, Houston, both of Tex.

[73] Assignee: FMC Corporation, Chicago, Ill.

[21] Appl. No.: 680,870

[22] Filed: Dec. 12, 1984

[51] Int. Cl.³ .............................................. F16S 15/18
[52] U.S. Cl. .................................................... 277/124
[58] Field of Search ................ 277/102, 123, 124, 125

[56] References Cited

U.S. PATENT DOCUMENTS

| | | | |
|---|---|---|---|
| 2,912,266 | 11/1959 | Nordell | 277/125 |
| 3,554,563 | 1/1971 | Schumacher | 277/124 |
| 3,586,341 | 6/1971 | Whittaker | 277/124 |
| 4,006,881 | 2/1977 | Gaillard | 277/124 |
| 4,398,731 | 8/1983 | Gorman | 277/124 |
| 4,474,382 | 10/1984 | Hjelsand | 277/123 |

Primary Examiner—Robert I. Smith
Attorney, Agent, or Firm—W. W. Ritt, Jr.; Richard B. Megley

[57] ABSTRACT

A valve stem packing assembly in the form of a stacked array of seal ring elements of generally V-shaped cross-sectional configuration, a plurality of backup-energizing rings of generally Y-shaped cross-sectional configuration interspersed between the seal ring elements, a spring-energized U-shaped lip seal ring adjacent one end of the array, and a T-shaped adapter ring adjacent the other end of the array.

5 Claims, 4 Drawing Figures

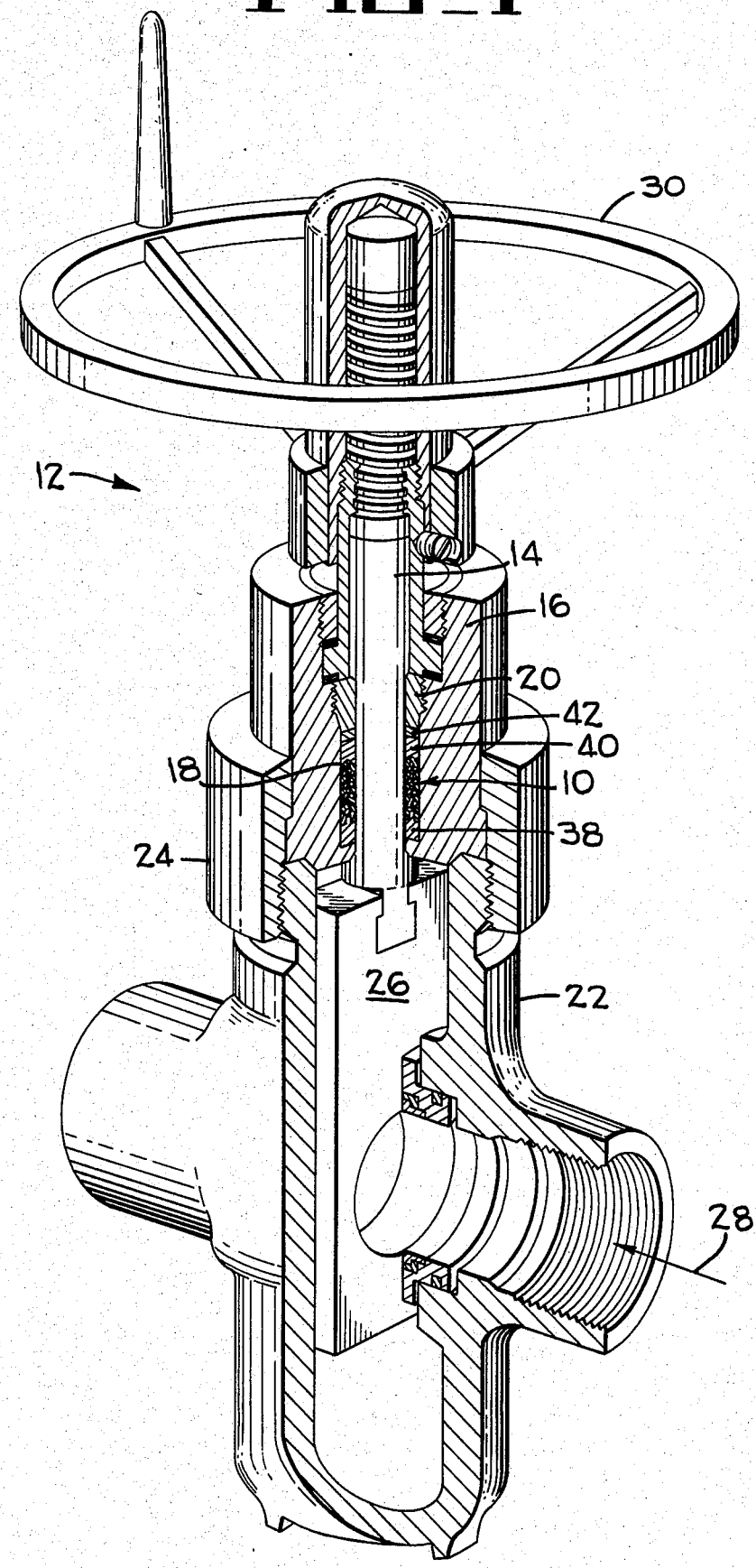
FIG_1

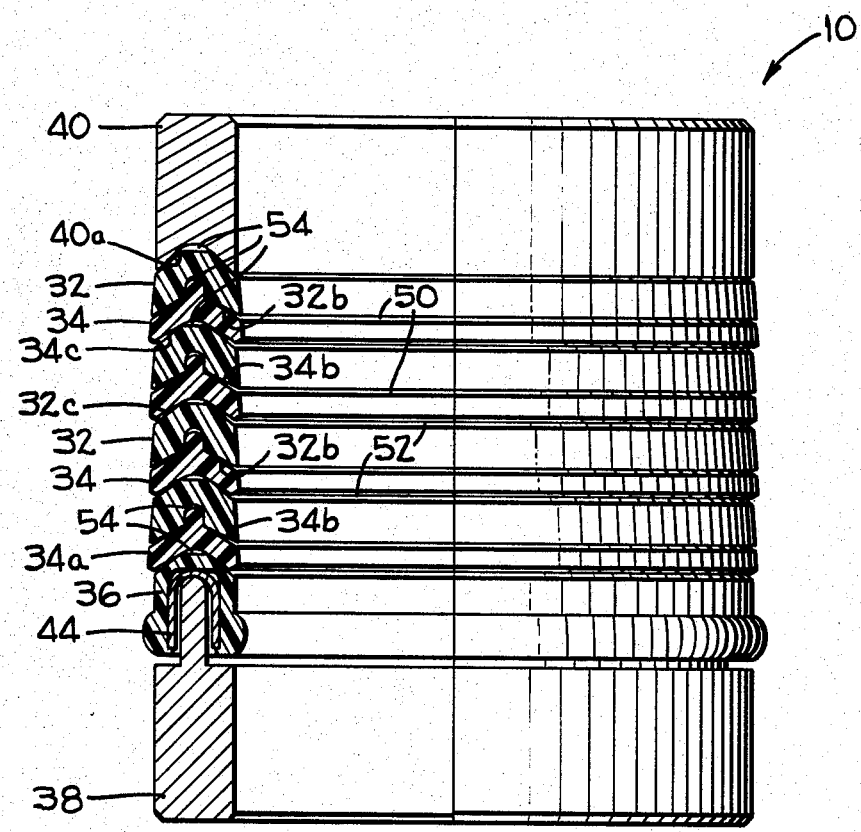
FIG_2

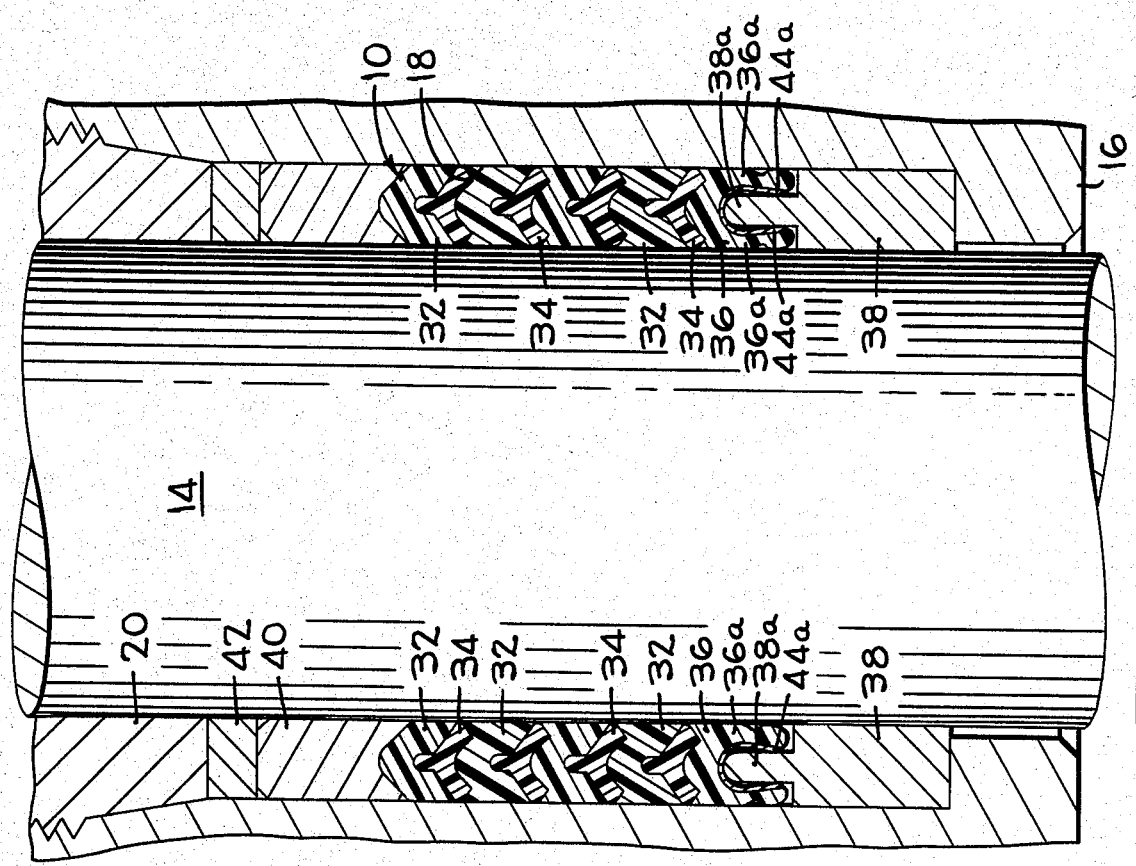
FIG_4
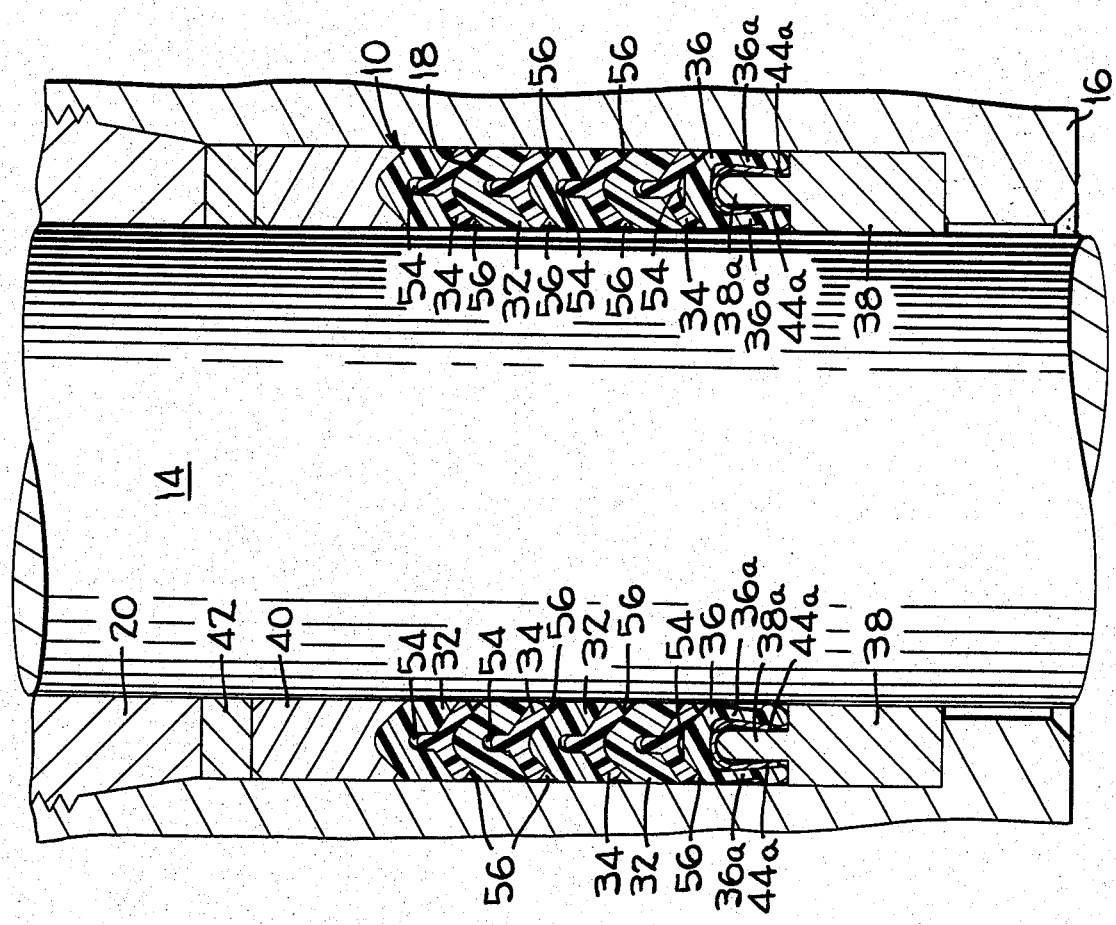
FIG_3

VALVE STEM PACKING

This invention relates generally to fluid seals, and more particularly to packings for providing a high pressure fluid seal between a valve stem and bonnet or other element surrounding the stem.

BACKGROUND

Although valve stem packings constructed of elastomeric materials are known to be satisfactory for a variety of conditions, such packings do not provide the desired sealing function when subjected to high pressure gas environments, their failure being due to the phenomenon known as "explosive decompression". Replacing elastomeric materials with non-elastomers eliminates the "explosive decompression" problem, but non-elastomers creep when subjected to pressure and then do not return to their original condition when the pressure is removed, i.e., they have no memory. Due to the creep problem and the difference in the coefficient of thermal expansion of non-elastomers and the metallic packing gland and stem of a valve conventional non-elastomeric stem packings leak after subjection to a pressure and temperature cycle.

In attempts to overcome the foregoing problems non-elastomeric lip seals having been provided with spring energizers to bias the sealing lips against the opposing metallic surface. Such a design is effective where the metallic surface is very smooth, but if the sealing lip is scratched or otherwise slightly damaged it will leak. Spring energized seals cannot be stacked in series to increase reliability unless a cartridge or other carrier is provided to contain them, but the carrier constitutes an undesirable additional part that adds to the cost, creates another potential leak path in the system, and necessitates enlargement of the packing gland and packing chamber.

SUMMARY OF THE INVENTION

The foregoing and other problems are solved by the present invention which, broadly considered, is embodied in a valve stem packing comprising a stacked assembly of V-ring seal elements, special backup energizing rings interspersed between the seal elements, and a spring-energized lip seal ring that is retained in functional positions by an adapter ring having a generally tee-shaped cross-sectional configuration. As the assembly is installed in a valve stem packing chamber with the T-adapter ring at one end of the assembly and a backup ring for the V-ring seal elements at the other end, the lip seal ring and the V-ring seal elements are radially compressed to establish an initial seal between the stem and the chamber wall. When the assembly is subjected to interval valve pressure the V-ring seal elements and the lip seal ring are additionally compressed and deformed to fill annular spaces that may still exist between the seal elements, their backup/energizing rings and the lip seal ring, thereby establishing an essentially void-free dynamic packing between the stem and the chamber wall that is capable of withstanding many hundreds of gate valve stroke cycles (valve open to closed to open constituting one cycle) at unusually high pressures of fifteen thousand pounds per square inch and above, and unusually high temperatures of two-hundred and fifty degrees Farenheit and above. Furthermore, a stem packing assembly according to the present invention is extrusion-free, insensitive to fluctuations in pressure and/or temperature, and exceedingly resistant to chemical attack.

BRIEF DESCRIPTION OF THE DRAWINGS

FIG. 1 is a diagrammatic view, partially in elevation and partially in vertical section, of a gate valve fitted with a stem packing assembly according to the present invention.

FIG. 2 is an enlarged view, the right half in elevation and the left half in vertical section, of a valve stem packing assembly according to the present invention, ready for installation in a valve such as illustrated in FIG. 1.

FIG. 3 is an enlarged fragmentary view of the valve of FIG. 1, showing the stem packing assembly of FIG. 2 in position surrounding the valve stem.

FIG. 4 is a view like FIG. 3 but showing the packing assembly when exposed to high internal valve pressure.

DESCRIPTION OF THE PREFERRED EMBODIMENT

In accordance with the present invention, and as illustrated in FIG. 1 of the drawings, a valve stem packing assembly 10 can be employed in a rising stem gate valve 12 to provide a high pressure, high temperature dynamic seal between the valve's stem 14 and bonnet 16. In the valve 12 the packing assembly 10 is located in, and confined to, a packing chamber 18 in the bonnet 16, and a packing gland nut 20 retains the packing assembly 10 in functional position in the chamber 18. The valve 12 further includes a body 22 to which the bonnet 16 is removably secured by a threaded retainer sleeve 24, and a gate element 26 connected to the stem 14 for translatory longitudinal movement between its illustrated upper or "valve open" position and its lower or "valve closed" position (not shown) wherein it blocks the flow, represented by arrow 28, through the valve. In the conventional manner the gate 26 is suitably connected to the stem 14 so that it is raised and lowered with the stem when a handwheel 30, or other suitable means of operating the valve, is actuated.

As seen more clearly in FIGS. 2-4, the packing assembly 10 comprises a plurality of V-ring seal elements in stacked array and oriented in an inverted attitude toward the valve gate 26, a like plurality of somewhat Y-shaped special backup/energizing rings 34 inverted and interspersed between and beneath the V-ring seal elements 32, a spring-energized lip seal ring 36 beneath the lowermost backup/energizing ring 34a, a lower adapter ring 38 having cross-sectional configuration generally resembling an inverted tee, and an upper adapter ring 40 with an inverted vee-shaped lower wall 40a that provides a backup function to the adjacent V-ring 32, a retaining function, in cooperation with the packing gland nut 20 and a spacer ring 42 (FIGS. 3 and 4), that prevents the packing assembly 10 from moving out of proper position in the chamber 19 during translation of the valve gate 26 from closed to open position, and also acts as a guide bearing for the valve item 14.

The preferred composition from which the V-ring seal elements 32 and the lip seal ring 36 are made is polytetrafluoroethylene (PTFE) filled with glass (fifteen percent), and molybdenum disulfide (five percent), and the special backup/energizing rings 34 preferably are composed of PTFE filled with carbon graphite (twenty-five percent). In order to preserve the functional integrity of the lip seal ring's U-shaped energizing spring 44, that spring preferably is constructed from a NACE (National Association of Corrosion Engineers)-approved metal such as, for example, ELGILOY which is a metallic alloy product of the Welby Clock Division of Elgin National Industries. With respect to the upper and lower adapter rings 40, 38, their preferred composition is glass-filled PEEK (polyetheretherketone) containing forty percent glass and two and one-half to five percent PPS (polyphenylenesulfide).

As shown in FIG. 2, the surfaces 32b of the V-ring seal elements 32 define an angle, with respect to the vertical, or greater magnitude than that defined by the opposed surfaces 34b of the backup/energizing rings 34, thereby establishing relatively small annular spaces or voids 50 between the elements 32 and rings 34 before the assembly 10 is installed in the packing chamber 18. Similarly, prior to installation the opposed surfaces 32c, 34c of the elements 32 and rings 34, respectively, define different angles with respect to the vertical, thereby also defining small annular spaces or voids 52 therebetween. Also as illustrated in FIG. 2, central annular spaces or voids 54 exist between the V-ring seal elements 32 and the adjacent backup/energizing rings 34, between the uppermost seal element 32 and the adaptor ring 40, and between the lowermost backup/energizing ring 34 and the lip seal ring 36, before installation of the assembly 10 in the valve 12.

As illustrated in FIG. 3, when the stem packing assembly 10 is installed in a properly sized packing chamber 18 surrounding a properly sized valve stem 14 the annular spaces or voids 50 and 52 disappear as a result of radial compression of the V-ring seal elements 32 and the backup/energizing rings 34, whereas the annular spaces or voids 54 remain. When installed as shown in FIG. 3, the seal elements 32, backup/energizing rings 34 and the adjacent surfaces of the valve bonnet 16 and the valve stem 14 define annular spaces or voids 56 of generally triangular shape in cross-section. Furthermore, when installed in the valve the lip seal ring 36 is radially compressed so that the edges 44a of the downwardly-facing energizing spring 44 deflect in the direction of the central upstanding "leg" 38a of the lower adapter ring 38.

When the packing assembly 10 is exposed to elevated internal valve pressure as shown in FIG. 4, the lips 36a of the lip seal 36 expand radially to effect an initial pressure seal with the stem 14 and the packing chamber 18, thereby facilitating the lip seal to function as a piston that transmits an axial force to the backup/energizing rings 34 and the V-ring seal elements 32, which force causes these rings and seal elements to migrate toward the backup ring 40. This migration causes deflection or deformation of the V-ring seal elements 32 which tend to fill the annular spaces 54, 56 and thus produce a voidless relationship between the seal elements, the backup/energizing rings 34, the lip seal ring 36, the upper adapter ring 40, the valve stem 14 and the wall of the packing chamber 18. As pressure increases the axial force transmitted to the V-ring sealing elements increases, thereby resulting in an increase in the sealing force exerted by the V-ring sealing elements against the valve stem and packing chamber wall, and providing a fluid-tight, dynamic seal that will withstand many hundreds of translatory cycles of the stem, at temperatures of at least 250 degrees F. and pressures of at least 15,000 psi.

Although the best mode contemplated for carrying out the present invention has been herein shown and described, it will be apparent that modification and variation may be made without departing from what is regarded to be the subject matter of the invention.

We claim:

1. A valve stem packing assembly in the form of a stacked array, comprising
    (a) a plurality of seal ring elements each having a generally V-shaped cross-sectional configuration;
    (b) a plurality of backup/energizing rings interspersed between and in supportive relationship with the seal ring elements, said backup/energizing rings having a generally Y-shaped cross-sectional configuration;
    (c) a spring-energized lip seal ring adjacent one of the backup/energizing rings, said lip seal ring including a central base and a pair of sealing lips extending therefrom whereby the lip seal ring has a generally U-shaped cross-sectional configuration; and
    (d) an adapter ring having a generally T-shaped cross-sectional configuration and extending into a supportive relationship with the lip seal ring to prevent dislocation of said seal ring when the packing assembly is in functional position between a valve stem and a surrounding valve element, and said valve stem is cycled in a translatory manner.

2. A valve stem packing assembly according to claim 1 including a second adaptor ring in supportive relationship with the seal ring elements.

3. A valve stem packing assembly according to claim 2 wherein the second adapter ring has a radial face that is generally V-shaped in cross-sectional configuration and that resides against a seal ring element.

4. A valve stem packing assembly according to claim 1 wherein the radial surfaces of the seal ring elements and the radial surfaces of the backup/energizing rings define annular voids that disappear when the packing assembly is properly installed in functional position in a properly sized valve packing chamber.

5. A valve stem packing assembly according to claim 1 wherein the backup/energizing rings and the adjacent seal ring elements are caused to migrate into a fluid-tight seal with opposing valve element surfaces in response to an axial piston-like force exerted by the lip seal ring.

* * * * *